Sept. 18, 1923.
G. D. MORGAN
SURVEYING INSTRUMENT
Filed June 11, 1920
1,468,368
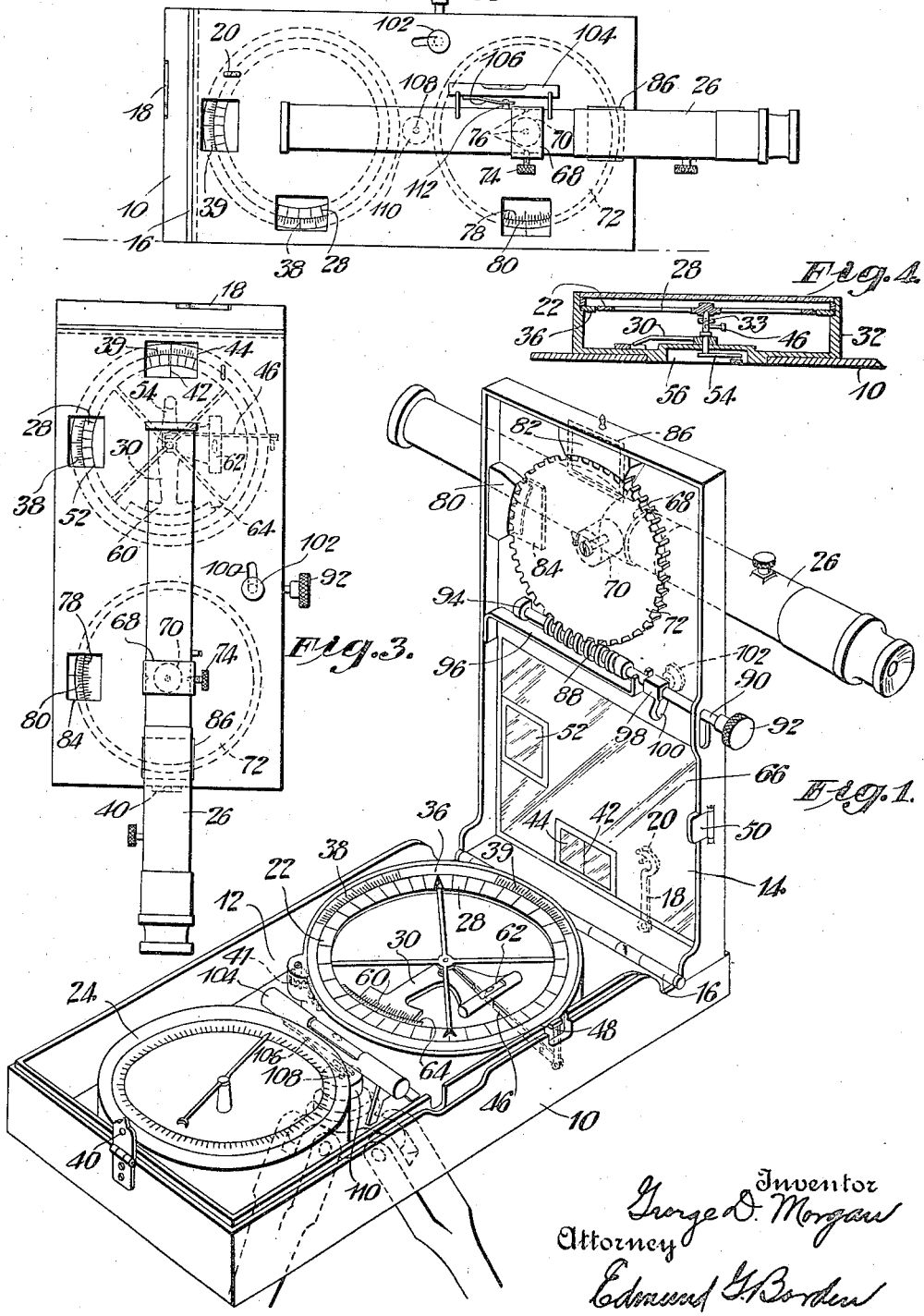

Patented Sept. 18, 1923.

1,468,368

UNITED STATES PATENT OFFICE.

GEORGE D. MORGAN, OF NEW YORK, N. Y.

SURVEYING INSTRUMENT.

Application filed June 11, 1920. Serial No. 388,168.

*To all whom it may concern:*

Be it known that I, GEORGE D. MORGAN, a citizen of the United States, residing at New York city, in the county of New York, State of New York, have invented certain new and useful Improvements in Surveying Instruments; and I do hereby declare the following to be a full, clear, and exact description of the invention, such as will enable others skilled in the art to which it appertains to make and use the same.

This invention relates to a surveying instrument and more particularly to an instrument especially adapted for use in surveying geological formations to determine the probable location of petroleum pools or other mineral deposits.

Petroleum deposits occur in definite bodies or pools whose exact location and extent can only be determined with certainty by drilling a number of wells covering the locality to be tested. No surface indication will give an accurate and infallible knowledge of the occurrence and extent of petroleum pools. Where the rock formation in which petroleum may occupy slopes in opposite directions and forms ridges and valleys in the superposed strata, it is often found that a pool of gas collects in the upper part of the ridge, that a pool of oil is formed immediately under the gas, and the lower part of the inclined stratum is filled with water or brine, the various fluids collecting in the order of their densities beneath a dome of impervious rock. Quite often, therefore, the probability of the occurrence of oil or gas in any given locality may be estimated by determining the slopes of out-cropping strata in the vicinity of the territory tested, and in this manner determining the position of domes or ridges and valleys in the underlying strata. It is necessary, in surveying new or "wild cat" territory to survey several hundreds of thousands of acres, or square miles, in order to map out those sections in which the oil producing indications are most favorable.

In carrying out these surveys, it is customary to first send a "scout" who makes rough observations and determines from these observations whether a particular district has favorable indications. In many cases, this scout may find from his observations that there is substantially no probability of finding oil and that further investigation may therefore be dispensed with; in other cases, that the indications may be sufficiently favorable to justify leasing the land. As a rule, however, a more accurate and thorough survey must be made before the land in which the indications are favorable will be leased. For this more accurate survey, a surveying party must be sent out with instruments capable of greater accuracy, entailing a much greater expense and a loss of time which may be even more important when there is keen competition in the obtaining of leases.

The primary object of the present invention is to provide a surveying instrument which may be as easily transported or carried as the instruments heretofore used in the preliminary or rough survey of the land, and which is capable of also making observations with an accuracy approaching that used in the second, more complete surveys.

Another object of the invention is to provide an instrument by means of which the general nature of the geological formation may be rapidly determined and by which the accuracy of these observations may be increased when the more rapid observations indicate that greater accuracy is necessary.

With these and other objects in view, the invention consists in the improved surveying instrument hereafter described and defined in the claims.

The various features of the invention are illustrated in the accompanying drawings, in which:

Fig. 1 is a perspective view of a surveying instrument embodying the preferred form of the invention, showing the same in open position on a tripod for alidade and transit use.

Fig. 2 is a view, in side elevation, of the instrument shown in Fig. 1, the parts being in position for use as an alidade and an accurate clinometer.

Fig. 3 is a top plan view of the surveying instrument showing the parts in position for use as an alidade and triangulation transit; and Fig. 4 is a detail vertical sectional view of the magnetic compass.

The surveying instrument illustrated in the drawings is intended primarily as a pocket instrument which may be folded and placed in a small case and be readily carried by a geologist in making preliminary surveys. The instrument embodies a magnetic float dial compass of the ordinary Brunton type, a transit, a level, a straight edge for plane table work, and an aneroid barometer for giving elevation readings.

The various parts of the surveying instrument illustrated in the drawings are mounted in a rectangular case which is preferably made of aluminum to avoid magnetic disturbances. The case 10 consists of a hollow box-like body 12 and a cover 14 which is connected to the top of the body by a hinge 16 and arranged to be held in fixed rectangular position on the body by means of a hook 18 having a cam face arranged to co-operate with an eye 20 on the cover. Or, in place of the hook and eye, any of the well known holding devices may be used. A circular Brunton compass 22 and an aneroid barometer 24 are mounted in the body 12 and a telescope 26 is pivotally secured to the cover 14.

The Brunton compass 22 consists of a float dial compass 28 and a sight level lever 30 which are mounted in a cylindrical casing 32. The dial 28 is mounted on a vertical pivot 33 secured in the bottom of the case 32 and has the usual magnetic deflections. The dial is graduated and moves within a corresponding circle 34 which is provided with vernier graduations 38 and 39 arranged at ninety degrees from one another. The circle 36 may be angularly adjusted to provide for magnetic declination by means of the usual screw gear 41. For making rough determinations of direction with the compass, sights 40 and 42 are used. The sight 40 is attached to the end of the body 12 and the sight 42 consists of a line formed on a glass window 44 mounted in the lower portion of the cover 14. These sights are on a line which intersects the axis of the dial 28.

At the time the compass is not in use, it is desirable that the dial be raised off of the pivot 33. To accomplish this, a lever 46 (Fig. 1) is pivoted to the case 32 and has one end slidably mounted on the pivot 33 in position to engage the dial at its axis. To the other end of the lever 46 is secured a plunger 48 arranged to engage a lug 50 on the cover 14 at the time the cover is closed. For this reason, the lug 50 is pivoted on the cover 14 and arranged to be turned downwardly so that it will not engage the plunger 48 at the time the cover is closed. To permit the compass to be observed when the cover 14 is closed, windows 44 and 52 are mounted in the cover in position to show the verniers 38 and 39.

The sight level attachment forming a portion of the Brunton compass comprises a bell-crank lever 30 which is secured to and movable with the pivot pin 33 and an adjusting arm 54 secured to the lower end of the pin 33. The adjusting arm 54 is positioned in a depression 56 in the bottom of the case 32 to permit the instrument to rest flatly upon a plane table. One arm of the bell-crank lever 30 is provided with a vernier scale 60 and the second arm is formed at right angles to the first arm and provided with a level bubble tube 62. The vernier scale 60 is arranged to move across a graduated arc 64 secured to the bottom of the compass case 32. The sights 40 and 42 are usually used in conjunction with the level bubble 62 in making sight levels, and a mirror 66 is mounted on the inner face of the lower half of the cover 14 to assist in bringing the level bubble into adjusted position in the same manner that the usual Brunton compass is adjusted. If the instrument is to be used as a clinometer it may rest upon the edge of a plane table or other surface and the level adjusted by means of the arm 54. At such time, one of the edges of the box, the sights 40 or 42, or the telescope 26 may be employed for sighting.

The telescope 26 is rotatably mounted upon the cover 14 and may be moved through a full circle to be used in any desired position. To this end, the telescope is mounted in a sleeve 68 which has a shank 70 projecting thru the cover and a worm gear 72 is threaded to the other end of the shank to hold the sleeve in a freely rotatable position. The telescope is locked in the sleeve by means of a set screw 74, the end of the screw being arranged to engage openings 76 in the barrel of the telescope by which the telescope may be held in any one of four positions at an angle of 90° with one another. By this arrangement the usual cross hairs and stadia lines may be used in the telescope and these may be brought into proper position for use with the telescope in any of its various positions. The telescope is preferably arranged to be longitudinally movable in the sleeve 68 so that the ends of the telescope may be moved to coincide with the ends of the case 10 when the instrument is closed to go into a case.

A graduated circle 78 is formed on the face of the gear 72 adjacent the inner face of the cover and is arranged to move under verniers 80 and 82 secured to the inner surface of the cover opposite windows 84 and 86. The verniers 80 and 82 project across the teeth of the gear 72 and co-operate with the graduated circle 78, the two verniers being provided so that one may be used if the telescope covers the other. The telescope is adjusted and locked in an adjusted position by means of a worm 88 which is formed on a spindle 90. The outer end of the spindle is provided with a thumb nut 92 and the inner end of the spindle is journaled in a swivelled pin 94 pivotally mounted in the cover 14. The worm is normally held in engagement with the teeth of the gear 72 by means of a leaf spring 96 which is attached to the cover with its free end in engagement with the spindle 90. When it is desired to roughly adjust the telescope or to swing it through a large arc, the worm may be moved out of engagement with the teeth 72 to permit the gear to be freely movable. Accordingly a bearing 98 is mounted on the spindle 90 adjacent the end of the spring 96 and has a shank projecting through a slot 100 in the cover with a thumb nut 102 threaded on its outer end. By releasing the thumb nut 102 the bearing 98 may be moved downwardly in the slot 100 (view in Fig. 1) to withdraw the worm 88 from the teeth of the gear 72 and the thumb nut may be used to lock the bearing in its lowered position.

When the telescope is used for reading vertical angles it is desirable both that the instrument is used in conjunction with a plane table or mounted on a tripod so that it may be adjusted into a level position. To accomplish this, a striding level bubble tube 104 is normally positioned within the casing body 12 between the Brunton compass 22 and the aneroid barometer 24. The level tube 62 of the Brunton compass may be readily adjusted substantially into a right angular position with reference to the level bubble tube 104 and these two levels may be used for bringing the instrument into a level position. This leveling of the instrument, of course, being accomplished by means of the usual ball and socket joint employed in tripods and Jacob's staffs. A spring clasp 106 is secured to the bottom of the level tube 104 which is arranged to engage a pin 108 mounted in the upper end of a boss 110 arranged to receive the screw of the usual tripod or Jacob's staff. The clasp 106 holds a striding level in fixed position upon the bottom of the casing to insure an accurate leveling of the instrument.

In many cases it may be desirable to use the telescope 26 for accurate levelling purposes. To this end the striding level tube 104 is detachable from the pin 108 and may be mounted upon the top of the telescope as illustrated in Fig. 2 for leveling purposes. When the level tube is positioned upon the telescope, it is locked in fixed position by means of the clasp 106 which engages a pin 112 secured in the barrel of the telescope.

The sight 40 attached to the instrument body 12 is in the form of a pivoted latch. The opening in the sight 40 is arranged to engage a pin 112 in the cover 14 to lock the cover in closed position.

In view of the construction described above, it is obvious that the surveying instrument of the present invention may be employed for many purposes, for example: If the instrument is being used in the position illustrated in Fig. 1, the sights 40 and 42 may be used in conjunction with the compass for determining directions, or the telescope may be used in conjunction with the compass for determining directions. At the same time, the telescope may be used for triangulation and for reading vertical angles. If the instrument is used in the open position shown in Fig. 1, upon a plane table, the sights 40 and 42 or the telescope 26 may be used for alidade work and the telescope may be used as a clinometer. Both the longitudinal and transverse sides of the case may be used as a straight edge for plane table work. If the instrument is closed, as illustrated in Fig. 3, and used upon a plane table, the telescope may be used for triangulation and at the same time, the angles read on the telescope scale 78 may be checked with the readings of the magnetic compass of the float dial 28. With the instrument in the position shown in Fig. 2, the telescope may be used as a level or as an alidade and at the same time may be used as a clinometer. With the cover in open position the instrument may be used in conjunction with the sights 40 and 42 as an ordinary Brunton compass for sight leveling.

Usually the sights 40 and 42, or an edge of the instrument will be used in making rough determinations with the instrument illustrated in the drawings. When a geological formation is found with favorable indications, the present instrument may be set up upon a tripod or plane table and the rough determination obtained by means of the sights accurately checked by means of a high power telescope. Such an instrument is capable of saving a great amount of time of a geologist or engineer, since it is suitable for the rough determination and for determinations of any desired accuracy. Furthermore, it is a folding pocket instrument that may be carried anywhere that the geologist or engineer may desire to go.

The preferred form of the invention having been described, what is claimed as new is:

1. A surveying instrument comprising a case, a compass and a leveling bubble tube mounted in said case, a sighting device so arranged in relation to said level and said compass that inclinations and directions may be observed, a rotatable telescope mounted on said casing independently of said sighting device for checking readings of said compass needle and said level.

2. A surveying instrument which comprises an elongated rectangular casing, a compass and leveling device mounted in said casing, a cover for said casing having a mirror on that portion covering the compass, a sight on said casing and a corresponding sight on said cover, windows in said cover covering a portion of said compass, a telescope rotatably mounted on the outside of said cover and a graduated scale movable with said telescope mounted on said cover.

3. A surveying instrument comprising a rectangular casing, a level tube rotatably mounted in said casing having a vernier movable therewith, a graduated scale mounted in the casing in position to register with said vernier, sights mounted in said casing in the axis of rotation of the level, a mirror mounted in the casing in position to observe the level when looking through the sights, a telescope rotatably mounted on said casing and a scale associated with said telescope for determining the angular positions thereof.

4. A surveying instrument comprising a rectangular casing having straight edges, a magnetic compass mounted in said casing, sights mounted on said casing in co-operative relation to said compass for use as an alidade, and a telescope provided with a graduated scale secured to said casing in position to supplement said compass for use as an alidade.

5. A surveying instrument having in combination a rectangular casing comprising a body and a cover pivoted thereto, means for holding said cover in upright position on said body, a telescope pivotally mounted on said cover, a scale movable with said telescope arranged to read angles, sights mounted on said casing for co-operation with said compass for determining directions and a level tube mounted on said casing.

6. A surveying instrument comprising a casing, a cover for said casing arranged to be secured in rectangular position with reference to the body of said casing, a telescope mounted on said cover, a graduated scale movable with said telescope and level tubes mounted in said casing arranged to be placed in right angular position with reference to one another.

7. A surveying instrument which comprises a straight edged case, a compass in said case said compass having a vernier and co-operating floating dial, a level in said case, a cover for said case, said covering having a mirrored inner surface adjacent said compass and provided with a sighting line and windows over the scale of said compass, a sight on said case, a telescope rotatably mounted on said cover, a worm wheel rigidly attached to and rotatable with said telescope and a releasable worm co-acting with said worm wheel.

8. A surveying instrument which comprises a straight edged case, a level tube in said case, a cover hinged to said case arranged to be secured in rectangular position with reference to the body of the casing, a telescope rotatively mounted on said cover, a worm wheel rigidly attached to and rotatable with said telescope, and a releasable worm co-acting with said worm wheel mounted on said cover.

In testimony whereof I affix my signature.

GEORGE D. MORGAN.